(12) United States Patent
Nakazato (10) Patent No.: US 10,785,469 B2
(45) Date of Patent: Sep. 22, 2020

(54) GENERATION APPARATUS AND METHOD FOR GENERATING A VIRTUAL VIEWPOINT IMAGE

(71) Applicant: CANON KABUSHIKI KAISHA, Tokyo (JP)

(72) Inventor: Yusuke Nakazato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 16/115,436

(22) Filed: Aug. 28, 2018

(65) Prior Publication Data

US 2019/0068955 A1 Feb. 28, 2019

(30) Foreign Application Priority Data

Aug. 30, 2017 (JP) .................................. 2017-166098

(51) Int. Cl.
*H04N 13/275* (2018.01)
*G06T 7/70* (2017.01)
(Continued)

(52) U.S. Cl.
CPC ........... *H04N 13/275* (2018.05); *G06T 7/194* (2017.01); *G06T 7/70* (2017.01); *G06T 7/75* (2017.01);
(Continued)

(58) Field of Classification Search
None
See application file for complete search history.

(56) References Cited

U.S. PATENT DOCUMENTS

| | | | | | |
|---|---|---|---|---|---|
| 5,850,352 | A | * | 12/1998 | Moezzi | H04N 13/139 345/419 |
| 7,330,183 | B1 | * | 2/2008 | Russo | G06T 15/04 345/427 |

(Continued)

OTHER PUBLICATIONS

Tetta Maeda et al; Free Viewpoint Video for Sport Events Using Multi-Resolution Visual Hull and Micro-Facet Billboarding;International Workshop on Smart Info-Media Systems in Asia (SISA 2016).
Hiroshi Sankoh; Free-viewpoint Video Synthesis for Sports Scenes Captured with a Single Moving Camera;ITE Transactions on Media Technology and Applications, vol. 3, No. 1, pp. 48-57.

*Primary Examiner* — Jason A Pringle-Parker
(74) *Attorney, Agent, or Firm* — Canon U.S.A., Inc. IP Division (57) ABSTRACT

A generation apparatus is configured to generate a virtual viewpoint image based on a plurality of images captured by a plurality of cameras for imaging a field from a plurality of different directions, the generation apparatus including an acquisition unit configured to acquire, based on a three-dimensional model of at least a portion of the field, correspondence information indicating correspondence between a coordinate of an image captured by at least one of the plurality of cameras and a coordinate related to a simple three-dimensional model less accurate than the three-dimensional model, and a generation unit configured to generate a virtual viewpoint image according to designation about a position and an orientation of a virtual viewpoint, by using an image captured by one or more of the plurality of cameras and the correspondence information acquired by the acquisition unit.

12 Claims, 7 Drawing Sheets

(51) Int. Cl.
    *G06T 7/194*     (2017.01)
    *H04N 13/117*     (2018.01)
    *G06T 7/73*     (2017.01)
    *H04N 13/279*     (2018.01)
    *H04N 5/247*     (2006.01)
    *H04N 13/00*     (2018.01)
    *H04N 13/243*     (2018.01)

(52) U.S. Cl.
    CPC ......... *H04N 13/117* (2018.05); *H04N 13/279* (2018.05); *G06T 2207/20081* (2013.01); *G06T 2207/20224* (2013.01); *G06T 2207/30221* (2013.01); *H04N 5/247* (2013.01); *H04N 13/243* (2018.05); *H04N 2013/0081* (2013.01)

(56) References Cited

U.S. PATENT DOCUMENTS

| | | | | |
|---|---|---|---|---|
| 2003/0206171 | A1* | 11/2003 | Kim | G06K 9/00234 345/473 |
| 2004/0181548 | A1* | 9/2004 | Thomas | G06F 16/58 |
| 2005/0041024 | A1* | 2/2005 | Green | G06T 15/06 345/426 |
| 2009/0066784 | A1* | 3/2009 | Stone | G06T 7/20 348/47 |
| 2009/0315978 | A1* | 12/2009 | Wurmlin | G06T 5/005 348/43 |
| 2017/0018121 | A1* | 1/2017 | Lawson | G06T 3/0093 |
| 2017/0309056 | A1* | 10/2017 | Uchinoumi | G06T 15/00 |

* cited by examiner

GENERATION APPARATUS AND METHOD FOR GENERATING A VIRTUAL VIEWPOINT IMAGE

BACKGROUND

Field of the Disclosure

The present disclosure relates to a generation method for generating a virtual viewpoint image.

Description of the Related Art

There is a technique for generating a free-viewpoint image (a virtual viewpoint image) by using a plurality of images captured by imaging a field with a plurality of cameras installed at different positions, which has been receiving attention lately. According to such a technique for generating a virtual viewpoint image, a highlight scene of a soccer or basketball game can be viewed from various angles. This is discussed in, for example, T. Maeda, et al. "Free Viewpoint Video for Sport Events Using Multi-Resolution Visual Hull and Micro-Facet Billboarding," International Workshop on Smart Info-Media Systems in Asia (SISA 2016). 2016. This technique can provide a user with a high realistic sensation as compared with an ordinary image.

In addition, there is known a method for rendering a virtual viewpoint image, based on a background image extracted from a three-dimensional model of a field and an image captured by a camera. This is discussed in, for example, Sankoh, Hiroshi, et al. "Free-viewpoint Video Synthesis for Sports Scenes Captured with a Single Moving Camera." ITE Transactions on Media Technology and Applications Vol. 3, No. 1, pp. 48-57, 2015.

However, if there is a difference between a shape represented by the three-dimensional model and the shape of the real field, the quality of the virtual viewpoint image may decline. If the three-dimensional model is highly accurate, the decline in image quality can be reduced. However, the amount of highly accurate data is large and therefore, processing time for processes such as rendering is enormous.

Accordingly, there is a need for generating a high-quality virtual viewpoint image at high speed.

SUMMARY

According to an aspect of the present disclosure, a generation apparatus is configured to generate a virtual viewpoint image based on a plurality of images captured by a plurality of cameras for imaging a field from a plurality of different directions, the generation apparatus including an acquisition unit configured to acquire correspondence information indicating correspondence between a coordinate of an image captured by at least one of the plurality of cameras based on a three-dimensional model of at least a portion of the field and a coordinate related to a simple three-dimensional model less accurate than the three-dimensional model, and a generation unit configured to generate a virtual viewpoint image according to designation about a position and an orientation of a virtual viewpoint, by using an image captured by one or more of the plurality of cameras and the correspondence information acquired by the acquisition unit.

Further features of the present disclosure will become apparent from the following description of exemplary embodiments (with reference to the attached drawings).

DESCRIPTION OF THE EMBODIMENTS

Exemplary embodiments of the present disclosure will be described below with reference to the drawings.

<Outline>

A generation apparatus 100 according to a first exemplary embodiment acquires correspondence information indicating correspondence between a simple three-dimensional model and an image captured by a camera. The generation apparatus 100 according to the present exemplary embodiment generates a virtual viewpoint image by pasting the image captured by the camera to the simple three-dimensional model based on the correspondence information at runtime (in rendering the virtual viewpoint image). Note that the above-described correspondence information is generated based on data of a three-dimensional model more accurate than the simple three-dimensional model. In the present specification, the exemplary embodiments are each described using the term "image", but this is not limited to a still image and includes a moving image.

Figure 1:
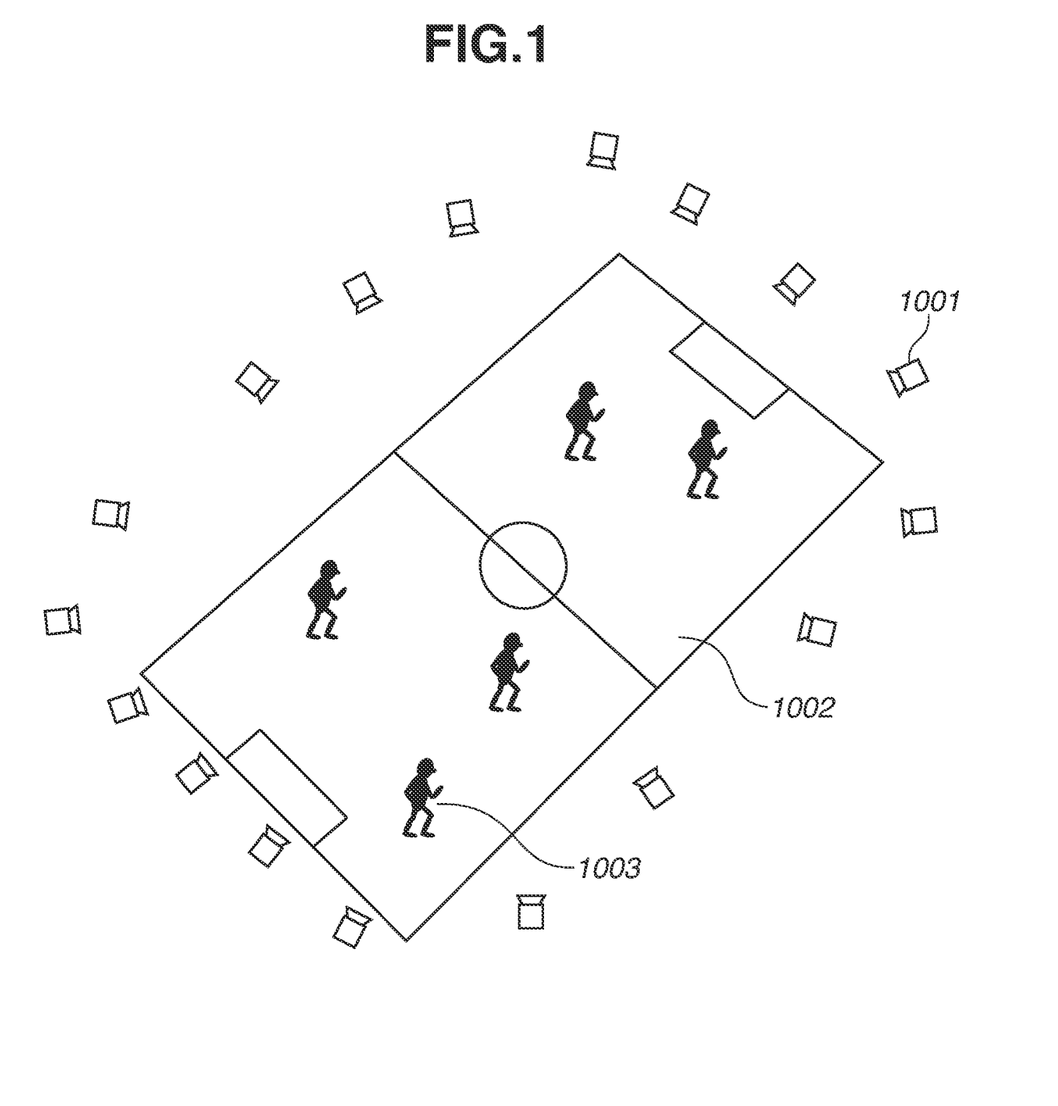
FIG. 1 is a diagram illustrating an example of a camera system.

In the present exemplary embodiment, a system in which a plurality of cameras 1001 images a field 1002 from the respective different directions is assumed, as illustrated in FIG. 1. The generation apparatus 100 according to the present exemplary embodiment then generates a virtual viewpoint image based on a plurality of images captured by the plurality of cameras 1001. The field 1002 can include an object 1003 such as a human figure. The virtual viewpoint is designated by a user or system. Examples of a term representing a concept similar to the virtual viewpoint image include a free-viewpoint image and an arbitrary viewpoint image.

Figure 2:
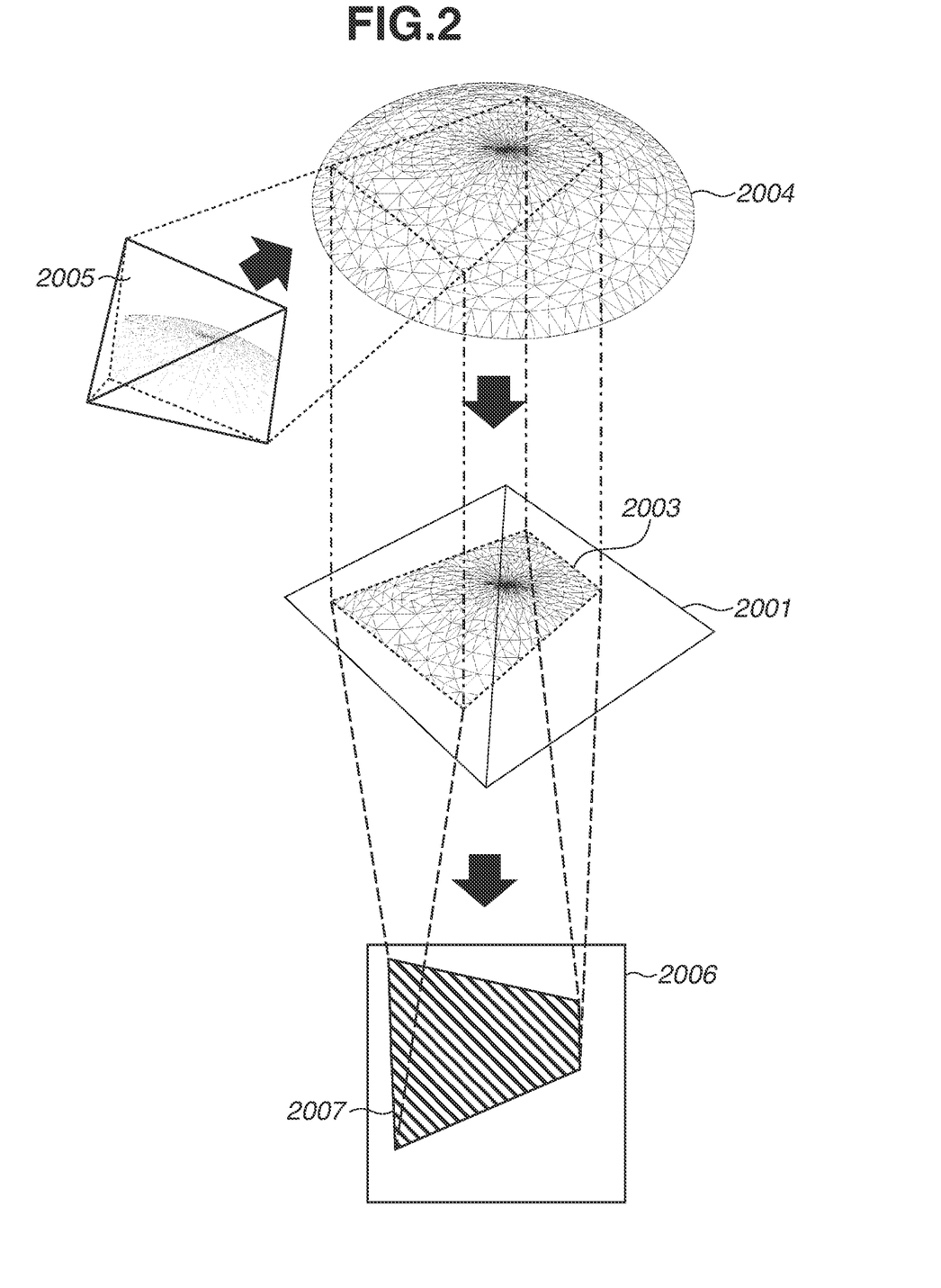
FIG. 2 is a diagram illustrating a concept of correspondence information.

FIG. 2 is a diagram illustrating the correspondence relationship between a simple three-dimensional model and an image captured by a camera. A three-dimensional model 2004 represents a three-dimensional shape of a real field (e.g., a sports venue) with high accuracy. A simple three-dimensional model 2001 represents a simple three-dimensional shape of the real field. In other words, the three-dimensional model 2004 and the simple three-dimensional model 2001 each represents a three-dimensional shape of the same field. However, the three-dimensional model 2004 represents the shape with higher accuracy than the simple three-dimensional model 2001. A region 2003 is a region on the simple three-dimensional model 2001 and corresponding to a captured image 2005.

In a case where a texture of the simple three-dimensional model 2001 is generated by pasting the image captured by the camera 1001 to the simple three-dimensional model 2001, the quality of the virtual viewpoint image may decline due to the influence of the difference between the real shape and the model shape.

Therefore, in the present exemplary embodiment, correspondence information indicating correspondence between the captured image 2005 of the camera 1001 and the texture of the simple three-dimensional model 2001 is prepared beforehand, with reference to the three-dimensional model 2004 representing the real shape with high accuracy, and camera parameters. Subsequently, at runtime (in rendering a virtual viewpoint video image), the captured image 2005 of the camera 1001 is pasted to the simple three-dimensional model 2001 based on the correspondence information, and rendering processing is performed using the result of this pasting. A high-quality virtual viewpoint image is thereby generated at high speed.

<Hardware Configuration>

Figure 3:
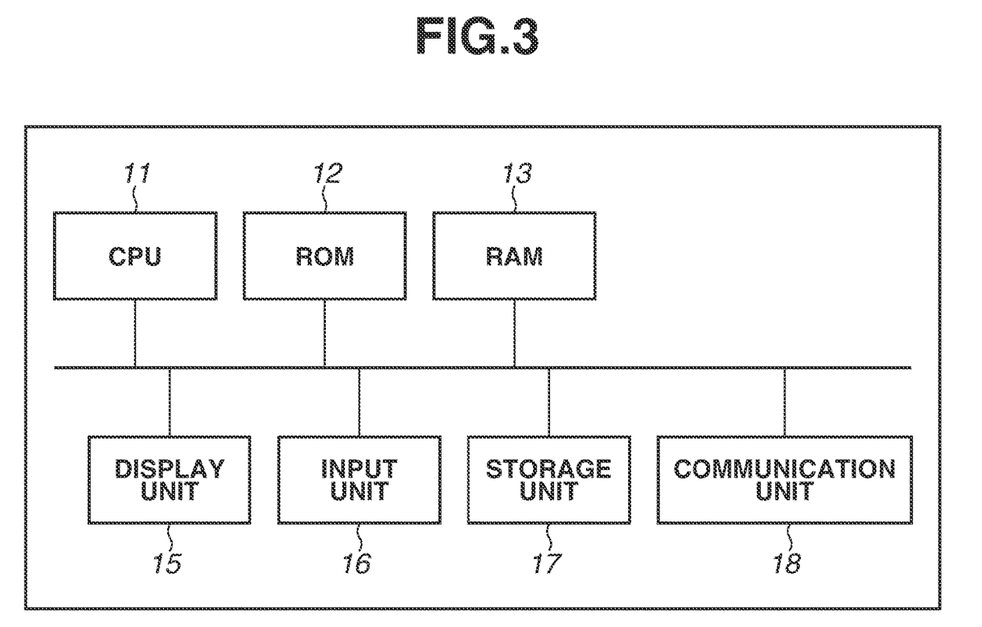
FIG. 3 is a diagram illustrating an example of a hardware configuration of a generation apparatus according to one or more aspects of the present disclosure.

FIG. 3 is a diagram illustrating an example of a hardware configuration of the generation apparatus 100 in the present exemplary embodiment. The generation apparatus 100 includes a central processing unit (CPU) 11, a read only memory (ROM) 12, a random access memory (RAM) 13, a display unit 15, an input unit 16, and a storage unit 17, as a hardware configuration. The CPU 11 controls various devices of the generation apparatus 100 that are connected to a system bus. The ROM 12 stores a program of a BIOS and a boot program. The RAM 13 is used as a main storage device of the CPU 11. The display unit 15 is a display for displaying a result of processing in a component such as the CPU 11. The input unit 16 accepts an operation input provided by the user. The input unit 16 may accept, for example, an operation input from a device such as a touch panel, a mouse, and a keyboard, and may accept an operation input from a remote controller. The storage unit 17 is a device such as a hard disk drive (HDD) for storing, for example, a program of an operating system (OS) and various application programs to run on the OS. A communication unit 18 is a communication module for communicating with an apparatus such as the camera 1001.

In the above-described configuration, when the generation apparatus 100 is powered on, the CPU 11 executes processing by reading a program such as the program of the OS from the storage unit 17 into the RAM 13 according to the boot program stored in the ROM 12, thereby implementing a function of the generation apparatus 100. In other words, the CPU 11 of the generation apparatus 100 executes the processing based on the program, thereby implementing a function of a configuration of the generation apparatus 100 and processing of a flowchart, which will be described below.

<Configuration>

Figure 4:
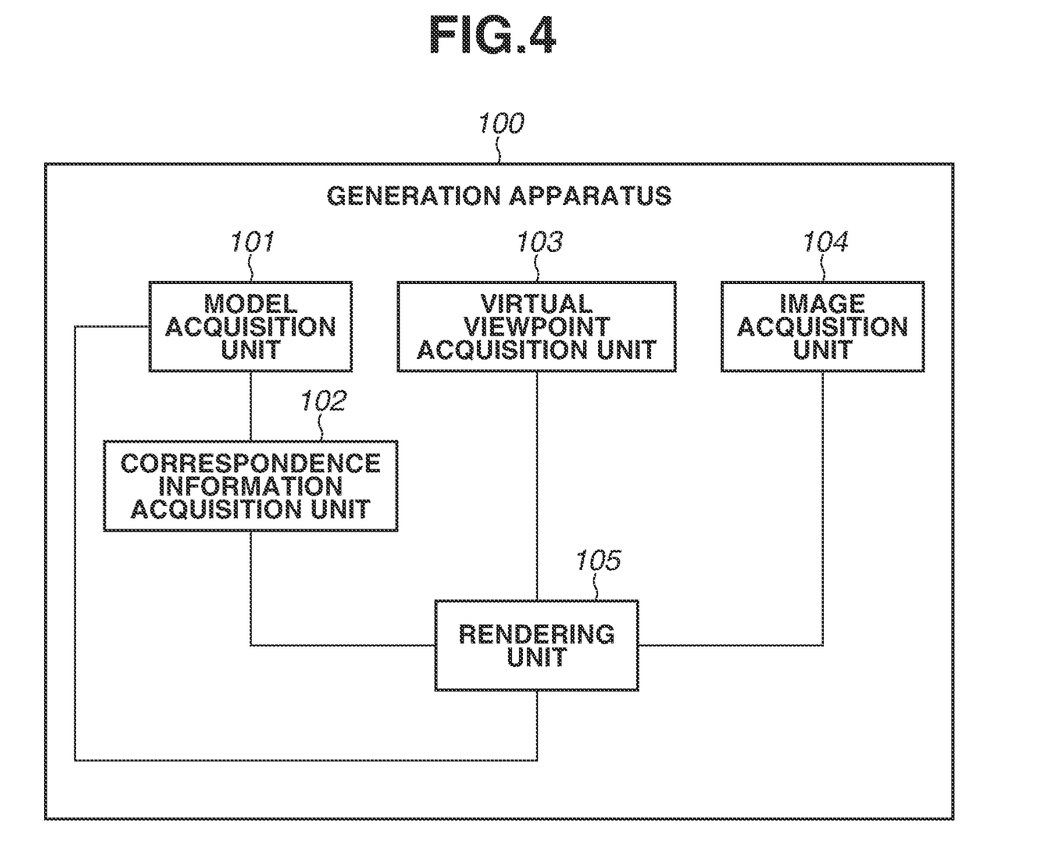
FIG. 4 is a diagram illustrating an example of a configuration of a generation apparatus according to one or more aspects of the present disclosure.

FIG. 4 is a diagram illustrating an example of the configuration of the generation apparatus 100. The generation apparatus 100 has a model acquisition unit 101, a correspondence information acquisition unit 102, a virtual viewpoint acquisition unit 103, an image acquisition unit 104, and a rendering unit 105, as illustrated in FIG. 4.

The model acquisition unit 101 acquires the simple three-dimensional model 2001, the three-dimensional model 2004, and the camera parameters of each of the cameras 1001. The three-dimensional model 2004 represents the shape of an imaging target with higher accuracy than the simple three-dimensional model 2001. The camera parameters include a position, an orientation, a focal length, a principal point position, and distortion information of each of the cameras 1001. The simple three-dimensional model 2001 and the three-dimensional model 2004 are each a mesh model, and includes the coordinates of each of the vertices of a three-dimensional shape, face information linking the vertices, and information indicating correspondence between each face and a texture.

The correspondence information acquisition unit 102 acquires correspondence information indicating correspondence between the captured image 2005 of the camera 1001 and the simple three-dimensional model 2001. The correspondence information indicates the correspondence relationship between a coordinate related to the simple three-dimensional model 2001 and a coordinate of the captured image 2005 of one or more of the cameras 1001. In the present exemplary embodiment, description will be provided focusing on an example of a case where the correspondence information is a two-dimensional map representing the correspondence relationship between the texture of the simple three-dimensional model 2001 and each pixel of each of the cameras 1001. In this case, each cell of the two-dimensional map indicated by the correspondence information stores the coordinate information of the captured image 2005 of the corresponding camera 1001.

To acquire the above-described correspondence information, the correspondence information acquisition unit 102 acquires first correspondence relationship information representing the correspondence relationship between the coordinate of the captured image 2005 of the camera 1001 and a coordinate of the three-dimensional model 2004. Further, the correspondence information acquisition unit 102 acquires second correspondence relationship information representing the correspondence relationship between the coordinate of the three-dimensional model 2004 and a coordinate of the simple three-dimensional model 2001.

The first correspondence relationship information is acquired by performing projection processing for projecting each coordinate of the captured image 2005 of the camera 1001 onto the three-dimensional model 2004, based on the camera parameters acquired by the model acquisition unit 101.

The second correspondence relationship information is acquired utilizing the fact that the positional relationship between the three-dimensional model 2004 and the simple three-dimensional model 2001 is known. To be more specific, the correspondence relationship between the coordinate of the three-dimensional model 2004 and the coordinate of the simple three-dimensional model 2001 is obtained by superimposing the three-dimensional model 2004 and the simple three-dimensional model 2001 on top of each other. In the present exemplary embodiment, description will be provided focusing on an example of a case where the correspondence relationship is obtained by performing projection processing for projecting the coordinate of the three-dimensional model 2004 onto a face of the simple three-dimensional model 2001, as illustrated in FIG. 2.

Since the correspondence relationship between the simple three-dimensional model 2001 and a texture map of the simple three-dimensional model 2001 is known, based on this correspondence relationship, the correspondence relationship between the coordinate of the captured image 2005 of the camera 1001 and the texture of the simple three-dimensional model 2001 can be obtained. In other words, the correspondence information acquisition unit 102 generates the correspondence information based on the first correspondence relationship information, the second correspondence relationship information, and the correspondence relationship between the simple three-dimensional model 2001 and the texture.

To be more specific, the generation apparatus 100 brings a coordinate of each cell in the texture map indicated by a texture map 2006 in FIG. 2 into correspondence with a coordinate of the simple three-dimensional model 2001. Further, the generation apparatus 100 establishes correspondence between a coordinate of the three-dimensional model 2004 corresponding to the coordinate of the simple three-dimensional model 2001 and a coordinate of the captured image 2005 of the camera 1001 corresponding to the coordinate of the three-dimensional model 2004. The correspondence information is thus obtained. In the example illustrated in FIG. 2, a coordinate of the captured image 2005 of the camera 1001 corresponding to a coordinate of a shaded area 2007 within the texture map 2006 is recorded.

The virtual viewpoint acquisition unit 103 acquires virtual viewpoint information. The virtual viewpoint information is virtual camera parameters including a position, an orientation, a principal point position, and a focal length of a virtual viewpoint (a virtual camera). In the present exemplary embodiment, description will be provided focusing on an example of a case where the virtual viewpoint information is stored in the storage unit 17 beforehand, and the virtual viewpoint acquisition unit 103 sequentially reads the virtual viewpoint information frame by frame from the storage unit 17.

The image acquisition unit 104 acquires an image captured by each of the cameras 1001. In the present exemplary embodiment, description will be provided focusing on an example of a case where the image captured by each of the cameras 1001 is stored in the storage unit 17 beforehand and the image acquisition unit 104 reads the captured images sequentially frame by frame from the storage unit 17. However, the image acquisition unit 104 may directly acquire the captured image from the camera 1001.

The rendering unit 105 generates (renders) a virtual viewpoint image, based on the three-dimensional model, the correspondence information, the captured image 2005 of each of the cameras 1001, and the virtual viewpoint information acquired by the model acquisition unit 101, the correspondence information acquisition unit 102, the virtual viewpoint acquisition unit 103, and the image acquisition unit 104. To be more specific, the rendering unit 105 pastes image data (pixel information) of the captured image 2005 of the corresponding camera 1001 to the texture map 2006 of the simple three-dimensional model 2001, by referring to the correspondence information acquired by the correspondence information acquisition unit 102. The texture is thus pasted to the simple three-dimensional model 2001. The rendering unit 105 then renders the virtual viewpoint image by using a technique of three-dimensional computer graphics (3DCG). The virtual viewpoint image represents a scene obtained by viewing, from the virtual viewpoint, the simple three-dimensional model 2001 to which the texture is pasted. The rendering result may be displayed by the display unit 15, may be stored into the storage unit 17, or may be transmitted to other apparatus by the communication unit 18.

In the present exemplary embodiment, the example in which each function illustrated in FIG. 4 is described. However, a hardware processor other than the CPU 11 may execute all or some of functional blocks in FIG. 4. Examples of the hardware processor other than the CPU 11 include an application specific integrated circuit (ASIC), a field programmable gate array (FPGA), and a digital signal processor (DSP). This also holds true for the following exemplary embodiment. Further, the generation apparatus 100 may have a plurality of CPUs 11.

<Flow of Processing>

A flow of information processing of the generation apparatus 100 will be described with reference to FIG. 5. The processing in FIG. 5 begins in response to an instruction for starting generation of a virtual viewpoint image. In the present exemplary embodiment, description will be provided focusing on an example of a case where the CPU 11 executes the processing of the flowchart in FIG. 5. However, an exclusive hardware processor may implement at least some of steps.

In step S1010, the model acquisition unit 101 acquires the simple three-dimensional model 2001 and the three-dimensional model 2004, as well as the camera parameters of each of the cameras 1001. In step S1020, the correspondence information acquisition unit 102 acquires the correspondence information indicating the correspondence relationship between the coordinate of the captured image 2005 of the camera 1001 and the texture of the simple three-dimensional model 2001. The correspondence information and the method for acquiring the correspondence information are described above in detail.

Figure 5:
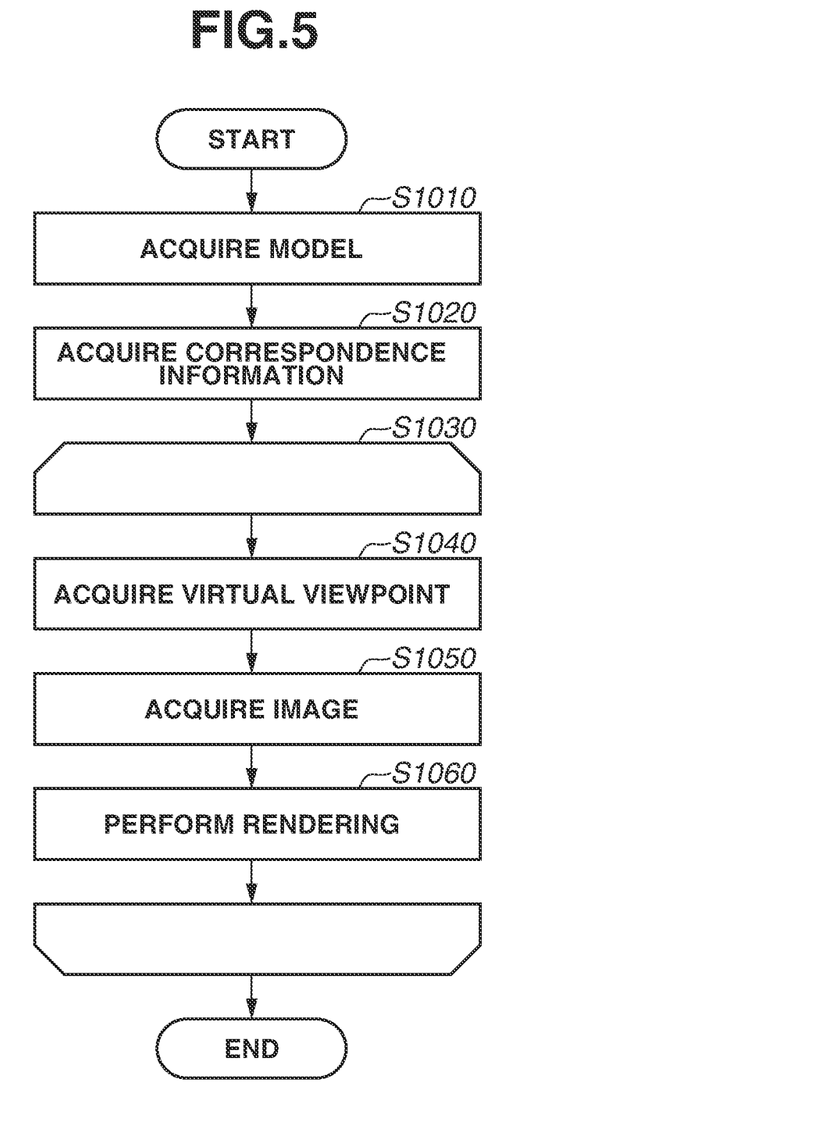
FIG. 5 is a flowchart illustrating an example of information processing of a generation apparatus according to one or more aspects of the present disclosure.

Step S1030 indicates that step S1040 to step S1060 are repeated until the processing according to FIG. 5 ends. The processing proceeds by one frame for each repeat. In step S1040, the virtual viewpoint acquisition unit 103 acquires the virtual viewpoint information for one frame. In step S1050, the image acquisition unit 104 acquires the captured image 2005 of each of the cameras 1001 for one frame.

In step S1060, the rendering unit 105 renders (generates) a virtual viewpoint image indicating a scene from the virtual viewpoint acquired in step S1040. The generated virtual viewpoint image may be displayed at the display unit 15, may be stored into the storage unit 17, or may be transmitted to other apparatus via the communication unit 18. The rendering unit 105 generates the virtual viewpoint image by using the three-dimensional model acquired in step S1010, the correspondence information acquired in step S1020, the virtual viewpoint information acquired in step S1040, and the captured image 2005 of each of the cameras 1001 acquired in step S1050. However, not all of the captured images 2005 of the respective cameras 1001 are necessarily required. The virtual viewpoint image is rendered (generated) using the captured image 2005 of the necessary one or more cameras 1001, according to features such as the position and the orientation of the virtual viewpoint (virtual camera).

Next, modifications of the present exemplary embodiment will be described. The modifications to be described below are applicable not only to the first exemplary embodiment but also to a second exemplary embodiment to be described below.

In the above-described exemplary embodiment, the description is provided focusing on the example in which the model acquisition unit 101 acquires the simple three-dimensional model 2001 and the three-dimensional model 2004, as well as the camera parameters of each of the cameras 1001. However, not all of these pieces of information are necessarily acquired by the model acquisition unit 101. For example, if the correspondence information is generated beforehand by an apparatus other than the generation apparatus 100, it is not necessary for the correspondence information acquisition unit 102 to acquire the three-dimensional model 2004 and the camera parameters.

Further, in the above-described exemplary embodiment, the description is provided focusing on the example of the case where the three-dimensional model is a mesh model. However, the three-dimensional model is not limited to this example. The three-dimensional model may be any of other types of model such as a free curved surface model, a solid model, and a three-dimensional point group, without being limited in terms of format. In other words, the three-dimensional model may be any type of information as long as the information represents a three-dimensional shape.

In addition, in the above-described exemplary embodiment, the description is provided focusing on the example of the case where the information of the texture map is included in the three-dimensional model acquired by the model acquisition unit 101. However, this is not limitative. If the information of the texture map is not included in the three-dimensional model, the model acquisition unit 101 may generate the texture map by using a conventional technique. The captured image 2005 itself of the camera 1001 can be the texture map.

The format and the generation method for the correspondence information are not limited to the examples described above. In other words, it is only necessary for the correspondence information acquisition unit 102 to acquire information indicating the correspondence relationship between a coordinate of the captured image 2005 of the camera 1001 and a coordinate related to the simple three-dimensional model 2001, as the correspondence information. The correspondence information may be, for example, a two-dimensional map representing correspondence between a coordinate of the captured image 2005 of each of the cameras 1001 and a coordinate of the texture of the simple three-dimensional model 2001. Further, the correspondence information may be, for example, a two-dimensional map representing correspondence between a coordinate of the captured image 2005 of each of the cameras 1001 and a coordinate on the surface of the simple three-dimensional model 2001. Furthermore, the correspondence information may be a list or group of pairs of a coordinate of the captured image 2005 of each of the cameras 1001 and a coordinate of the texture map. Moreover, in a case where the correspondence information is expressed in two-dimensional map format, a coordinate of the texture map with respect to the pixel of each of the cameras 1001 may be stored, or conversely, a coordinate of the captured image 2005 may be stored in each cell of the texture map.

In a case where the rendering unit 105 is presumed to generate the virtual viewpoint image by performing blending processing for the captured images 2005 of the two or more cameras 1001, a two-dimensional map for each of the cameras 1001 may be acquired as the correspondence information. However, the format of the correspondence information is not limited to this example, and may be, for example, such a format that each cell of one two-dimensional map stores a group of pairs of identification information of the camera 1001 and a coordinate of the captured image 2005.

Further, in the present exemplary embodiment, the description is provided focusing on the example of the case where the format of the correspondence information is the format of bringing each cell of a two-dimensional map into correspondence with a pixel (coordinates) of the captured image 2005 of the camera 1001. However, this is not limitative. For example, a format of bringing the pixel (coordinates) of the captured image 2005 into correspondence with the two-dimensional map may be adopted. In a case where the correspondence information in such a format is generated, for example, the following method can be adopted. The correspondence may be traced, first, from a pixel of the captured image 2005 to the three-dimensional model 2004, and subsequently, from the three-dimensional model 2004 to the simple three-dimensional model 2001, and finally, from the simple three-dimensional model 2001 to the texture map 2006.

Furthermore, in the above-described exemplary embodiment, the description is provided focusing on the example of the case where, for the correspondence between the simple three-dimensional model 2001 and the three-dimensional model 2004, the correspondence relationship is identified by superimposing these models on top of each other by utilizing the fact that the positional relationship of these models is known. However, note that there are variations to this method. In other words, the corresponding coordinate may be determined by projecting each coordinate of the simple three-dimensional model 2001 onto the three-dimensional model 2004 along a predetermined axis. Further, the corresponding coordinate may be determined by projecting each coordinate of the three-dimensional model 2004 onto the simple three-dimensional model 2001 along a predetermined axis. In another method, for a coordinate of one of three-dimensional models, a coordinate corresponding to the other of the three-dimensional models may be searched for in the normal direction of the former coordinate, and correspondence between the two three-dimensional models may be thereby established. As for a method for searching for the corresponding coordinate, a point near a projection point may be searched for. If a correspondence destination is a face, a coordinate of a point projected onto the face may be searched for. Alternatively, a coordinate of an intersection between a straight line, which is formed of a target point as well as a search direction for the target point, and the face may be searched for.

The generation method for generating the correspondence information also has variations, and is not limited to the above-described method. For example, a height map of the simple three-dimensional model 2001 may be generated based on the three-dimensional model 2004, and the correspondence information may be acquired by establishing correspondence between the simple three-dimensional model 2001 reflecting the height map and the captured image 2005 of the camera 1001. The height map can be generated in the following procedure. First, the correspondence information acquisition unit 102 identifies a correspondence relationship by superimposing the three-dimensional model 2004 and the simple three-dimensional model 2001 on top of each other. Next, the correspondence information acquisition unit 102 stores a distance to a point on the three-dimensional model 2004 corresponding to each cell of the two-dimensional map of each face of the simple three-dimensional model 2001, thereby generating a height map. In a case where the coordinate system of the simple three-dimensional model 2001 and the coordinate system of the three-dimensional model 2004 are different, registration of these two models may be performed by a known method such as iterative closest point (ICP).

Correspondence between the three-dimensional model 2004 and the simple three-dimensional model 2001 may be established, for example, as follows. First, a two-dimensional map corresponding to each face of the simple three-dimensional model 2001 is generated. Subsequently, from a surface point of the simple three-dimensional model 2001 corresponding to each cell of the two-dimensional map, a surface point of the three-dimensional model 2004 in the normal direction of the former surface point is searched for, and correspondence between the two points is thereby established. The distance between the surface points is stored in the cell of the two-dimensional map, as height information of a height map. Instead of the searching for the surface point of the three-dimensional model 2004 from the surface point of the simple three-dimensional model 2001, the surface point of the simple three-dimensional model 2001 may be searched from the surface point of the three-dimensional model 2004. The search direction is not limited to the normal direction, and may be a predetermined axial direction. Moreover, correspondence with a nearest surface point may be established. The height map and the texture map of the simple three-dimensional model 2001 are two-dimensional maps for the identical face. Therefore, the correspondence between the height map and the texture map can be uniquely determined. Hence, based on the camera parameters of each of the cameras 1001, the correspondence relationship between each pixel (coordinates) of the captured image 2005 of the camera 1001 and the surface point of the simple three-dimensional model 2001 reflecting a shape change caused by the height map can also be identified. Further, if each pixel is brought into correspondence with the texture map corresponding to the height map, correspondence information can be generated.

In the above-described exemplary embodiment, the description is provided focusing on the example of the case where the virtual viewpoint information is the virtual camera parameters including the position, the orientation, the principal point position, and the focal length of the virtual viewpoint (the virtual camera). However, this example is not limitative. For example, there may be a case where parameters such as the principal point position and the focal length of the virtual camera are set in the system as fixed values, and only the position and the orientation of the virtual camera can be freely set. In such a case, the virtual viewpoint acquisition unit 103 can acquire only information indicating the position and the orientation of the virtual camera as the virtual viewpoint information.

Further, as the virtual viewpoint information, a viewing angle and zoom information of the virtual camera may be acquired, or a parameter of lens distortion may be acquired. Furthermore, the virtual viewpoint information may be a parameter representing a spherical or panoramic omnidirectional camera. Furthermore, the method for acquiring the virtual viewpoint information is not limited to the method of reading out from the storage unit 17. The virtual viewpoint information may be acquired based on a user operation on an input device such as a keyboard, a mouse, a controller, a joy stick, a 3D mouse, or an inertia sensor. In this case, the input unit 16 accepts various inputs from the input device. A method for inputting the virtual viewpoint information by using the input device includes, for example, a case where a user steers a virtual camera in real time during a soccer game or a case where a user inputs the virtual viewpoint information by using a program such as an application for creating computer graphics (CG). Alternatively, the method may also include a case where the virtual viewpoint information is automatically determined according to motion of an object 1003 such as a human figure or a ball. The virtual viewpoint acquisition unit 103 can also acquire the virtual viewpoint information that has been automatically determined.

Among the steps in the flowchart illustrated in FIG. 5, for example, step S1010 and step S1020 may be performed beforehand. In other words, step S1010 and step S1020 may be completed beforehand based on a first user operation, and step S1030 and subsequent steps may be performed based on a second user operation. The correspondence information can be reused and therefore, it is not necessary to perform step S1010 and step S1020 each time step S1030 is executed. In other words, there is a case where step S1010 and step S1020 can be omitted.

The camera 1001 may be a color camera or a gray camera, or may be an RGB-D camera or a three-dimensional measurement apparatus. The image acquisition unit 104 may acquire the captured image 2005 directly from the camera 1001, or may acquire the captured image 2005 by reading out the captured image 2005 from the storage unit 17. The captured image 2005 may be a captured image subjected to vibration suppression control using a known technique.

The rendering unit 105 may perform a color adjustment for matching colors between the two or more cameras 1001 by using a known method, when pasting the pixel information of the captured image 2005 to the texture map of the simple three-dimensional model 2001 based on the correspondence information. In a case where image-capturing regions overlapping each other between the two or more cameras 1001 is present in the texture map, the rendering unit 105 may generate the texture map by blending the captured images 2005 of the respective two or more cameras 1001. The ratio of the blending may be an average, or the blending may be performed based on a ratio according to the direction or position of the camera 1001 with respect to a face corresponding to the texture map. The rendering unit 105 may paste a predetermined color or texture to an area of the texture map corresponding to none of the cameras 1001, or may copy a texture from other area of the texture map. Alternatively, the area may be filled using a known image-loss restoration technique.

In addition, the rendering unit 105 may set a light source based on the time and weather at the time of imaging, when performing rendering based on the simple three-dimensional model 2001 to which the texture is pasted. Further, the virtual viewpoint image rendered (generated) by the rendering unit 105 may be displayed at the display unit 15, may be saved into the storage unit 17, or may be transmitted to a terminal of a viewer via a network.

<Summary>

Next, the second exemplary embodiment of the present disclosure will be described focusing on a difference from the first exemplary embodiment. In the present exemplary embodiment, a background is rendered based on correspondence information indicating the correspondence relationship between the simple three-dimensional model 2001 and the captured image 2005 of the camera 1001. A virtual viewpoint image is then generated by synthesizing a foreground image and the background image. In the present exemplary embodiment, the description will be provided focusing on an example in which a foreground and a background are separated, assuming the foreground to be a moving object and the background to be a motionless object. A hardware configuration of a generation apparatus 200 according to the present exemplary embodiment is similar to the hardware configuration of the first exemplary embodiment and thus will not be described.

<Configuration>

Figure 6:
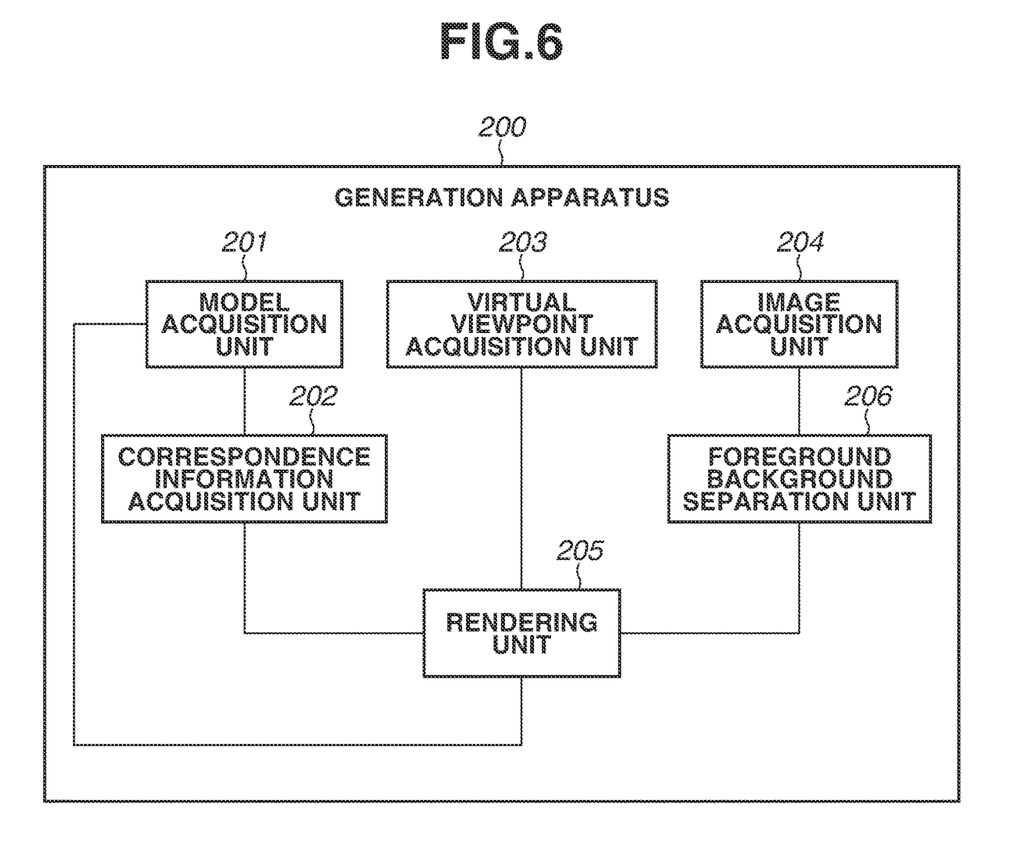
FIG. 6 is a diagram illustrating an example of a configuration of a generation apparatus according to one or more aspects of the present disclosure.

FIG. 6 is a diagram illustrating an example of a configuration of the generation apparatus 200 according to the present exemplary embodiment. The generation apparatus 200 has a model acquisition unit 201, correspondence information acquisition unit 202, a virtual viewpoint acquisition unit 203, an image acquisition unit 204, a rendering unit 205, and a foreground background separation unit 206. The model acquisition unit 201 to the image acquisition unit 204 are similar to the model acquisition unit 101 to the image acquisition unit 104 of the first exemplary embodiment.

The foreground background separation unit 206 separates the captured image 2005 of each of the cameras 1001 acquired by the image acquisition unit 204 into a foreground area and a background area. The foreground background separation unit 206 then generates a foreground image (an image of the foreground area) and a background image (an image in which absence of the foreground area in the captured image 2005 is filled). For a foreground background separation method, various methods are known. As an example, a background difference method will be introduced. In the background difference method, a field where no moving object is present is imaged beforehand by the plurality of cameras 1001, and a captured image obtained by this imaging is saved beforehand as an image with no foreground. Subsequently, a foreground area is extracted based on a difference between the image with no foreground and a captured image (of, for example, a game being played). In the present exemplary embodiment, description will be provided focusing on an example of a case where the foreground background separation unit 206 separates a foreground and a background by using the above-described background difference method. Further, the foreground background separation unit 206 can update the background image by adding the saved image with no foreground and the background image generated in the manner described above by assigning predetermined weights to these images.

The rendering unit 205 renders (generates) a virtual viewpoint image, based on the simple three-dimensional model 2001, correspondence information, and virtual viewpoint information, in addition to the foreground image and the background image which are generated by the foreground background separation unit 206, of each of the cameras 1001. Specifically, the background image is rendered using a method similar to the method of the rendering unit 105 according to the first exemplary embodiment. The foreground image is rendered using a technique described in T. Maeda, et al. "Free Viewpoint Video for Sport Events Using Multi-Resolution Visual Hull and Micro-Facet Billboarding." International Workshop on Smart Info-Media Systems in Asia (SISA 2016). 2016. The rendered foreground image is then superimposed on the background image. The rendering result may be displayed by the display unit 15, may be stored into the storage unit 17, or may be transmitted to other apparatus by the communication unit 18.

<Flow of Processing>

Figure 7:
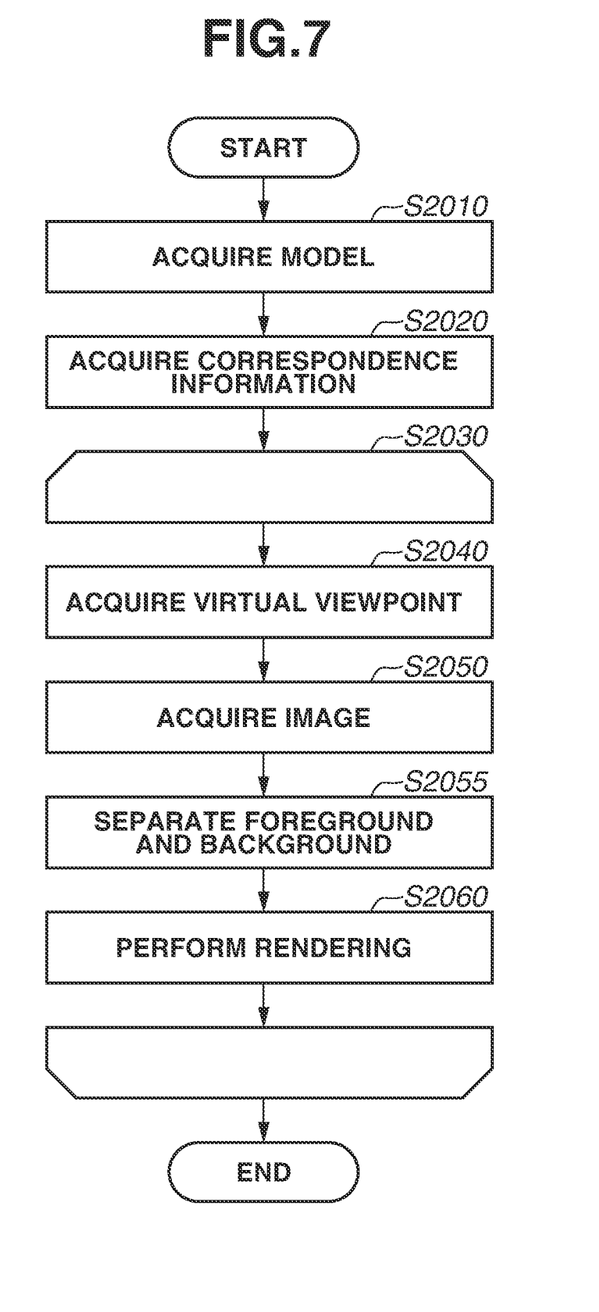
FIG. 7 is a flowchart illustrating an example of information processing of a generation apparatus according to one or more aspects of the present disclosure.

A flow of information processing of the generation apparatus 200 will be described with reference to FIG. 7. The processing of the present exemplary embodiment is partially similar to the flowchart of the first exemplary embodiment illustrated in FIG. 5, and a difference will be described below.

Step S2010 to step S2050 are similar to step S1010 to step S1050 of the first exemplary embodiment. In step S2055, the foreground background separation unit 206 separates the foreground area and the background area from the captured image 2005 of each of the cameras 1001 acquired in step S2050, and generates the foreground image and the background image.

In step S2060, the rendering unit 205 renders (generates) a virtual viewpoint image based on the virtual viewpoint information acquired in step S2040. In addition to the foreground image and the background image, the simple three-dimensional model 2001, the correspondence information, and the virtual viewpoint information are used for the rendering.

Next, modifications of the present exemplary embodiment will be described. In a case where the image acquired by the image acquisition unit 104 is already separated into the foreground image and the background image, the foreground background separation processing by the foreground background separation unit 206 is unnecessary. In a case where the foreground background separation processing is completed before start of the processing of the flowchart in FIG. 7, step S2055 is unnecessary or can be simplified.

In the above-described exemplary embodiment, the description is provided focusing on the example of the case where the background difference method is used as the foreground background separation method, but the foreground background separation method is not limited to this example. In another example, the foreground area and the background area may be classified using a result of machine learning of the foreground area and the background area. Further, there may be used a method for separating the ground and a three-dimensional object as the background area and the foreground area, respectively, by projecting the captured images 2005 of the adjacent cameras 1001 on the ground and determining a difference. There may be adopted a method for identifying the foreground area based on a time difference between the captured images 2005 of the respective cameras 1001.

Further, in the above-described exemplary embodiment, the description is provided focusing on the example of the case where the rendering unit 205 generates the virtual viewpoint image including the foreground image and the background image. However, this is not limitative. For example, only the foreground image based on the virtual viewpoint information may be generated, or only the background image based on the virtual viewpoint information may be generated. The method for rendering the foreground is not limited to the method discussed in T. Maeda, et al. "Free Viewpoint Video for Sport Events Using Multi-Resolution Visual Hull and Micro-Facet Billboarding." International Workshop on Smart Info-Media Systems in Asia (SISA 2016). 2016. Any other conventional technique for generating a virtual viewpoint image may be used. For example, a method called image-based rendering may be used. In this method, the two or more captured images 2005 that are captured by the two or more cameras 1001 are transformed and synthesized. Alternatively, for example, a method called model-based rendering may be used. In this method, a depth or a three-dimensional shape is restored and utilized. When a virtual viewpoint image representing a scene from a virtual viewpoint is rendered, the foreground image may be synthesized on the background image (frontward as viewed from the virtual camera), or synthesis may be performed after a depth is determined based on depth information of the foreground image and the background image. The restored three-dimensional model (the simple three-dimensional model 2001 to which the texture is pasted based on the correspondence information) of each of the foreground and the background may be simultaneously rendered using a technique of three-dimensional computer graphics (3DCG).

According to the above-described present exemplary embodiment, a high-quality virtual viewpoint image can be rendered at high speed, even for a scene where a moving object is present.

Some exemplary embodiments of the present disclosure are described above in detail. However, the present disclosure is not limited to these specific exemplary embodiments.

According to the present exemplary embodiments, a high-quality virtual viewpoint image can be generated at high speed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-166098, filed Aug. 30, 2017, which is hereby incorporated by reference herein in its entirety.

What is claimed is:

1. A generation apparatus comprising:
one or more memories storing instructions; and
one or more processors executing the instructions to:
acquire, based on a first three-dimensional model of an object captured by a plurality of cameras from a plurality of different directions, correspondence information indicating correspondence between a point of an image captured by at least one of the plurality of cameras and a point related to a second three-dimensional model of the object less accurate than the first three-dimensional model, wherein the correspondence information is acquired based on first correspondence relationship information and second correspondence relationship information, the first correspondence relationship information representing a correspondence relationship between a point of the image captured by at least one of the plurality of cameras and a point of the first three-dimensional model, and the second correspondence relationship information representing a correspondence relationship between a point of the first three-dimensional model and a point related to the second three-dimensional model; and
generate a virtual viewpoint image according to a position and an orientation of a virtual viewpoint, by using an image captured by one or more of the plurality of cameras and the acquired correspondence information.

2. The generation apparatus according to claim 1, wherein the correspondence information indicates correspondence between a point of the image captured by at least one of the plurality of cameras and a point in a texture corresponding to the second three-dimensional model.

3. The generation apparatus according to claim 1, wherein the correspondence information indicates correspondence between a point of the image captured by at least one of the plurality of cameras and a point located on a surface of a shape represented by the second three-dimensional model.

4. The generation apparatus according to claim 1, wherein the one or more processors further execute the instructions to
determine, by using the correspondence information, pixel information to be in correspondence with a point in a texture of the second three-dimensional model, among pixel information of the images captured by the plurality of cameras, and
wherein the virtual viewpoint image is generated based on the position and the orientation of the virtual viewpoint, and the texture of the second three-dimensional model to which the pixel information is applied according to the determining.

5. The generation apparatus according to claim 1, wherein the correspondence information is acquired from a storage device that stores the correspondence information.

6. The generation apparatus according to claim 1, wherein the first correspondence relationship information is generated using a camera parameter about a position and an orientation of the at least one of the cameras.

7. The generation apparatus according to claim 1, wherein the second correspondence relationship information is generated by executing projection processing for determining a point included in the second three-dimensional model corresponding to a point included in the first three-dimensional model.

8. The generation apparatus according to claim 1, the one or more processors further execute the instructions to extract an area of a predetermined object from the plurality of images obtained by the plurality of cameras,
wherein an image of a background area excluding the predetermined object in the virtual viewpoint image is generated by using the image captured by one or more of the plurality of cameras and the correspondence information, and an area of the predetermined object in the virtual viewpoint image is generated based on data of an image corresponding to extracted area.

9. A generation method comprising:
acquiring, based on a first three-dimensional model of an object captured by a plurality of cameras from a plurality of different directions, correspondence information indicating correspondence between a point of an image captured by at least one of the plurality of cameras and a point related to a second three-dimensional model of the object less accurate than the first three-dimensional model, wherein the correspondence information is acquired based on first correspondence relationship information and second correspondence relationship information, the first correspondence relationship information representing a correspondence relationship between a point of the image captured by at least one of the plurality of cameras and a point of the first three-dimensional model, and the second correspondence relationship information representing a correspondence relationship between a point of the first three-dimensional model and a point related to the second three-dimensional model; and generating a virtual viewpoint image according to a position and an orientation of a virtual viewpoint, by using an image captured by one or more of the plurality of cameras and the acquired correspondence information.

10. The generation method according to claim 9, wherein the correspondence information indicates correspondence between a point of the image captured by at least one of the plurality of cameras and a point in a texture corresponding to the second three-dimensional model.

11. The generation method according to claim 9, wherein the generating includes determining, by using the correspondence information, pixel information to be in correspondence with a point in a texture of the second three-dimensional model, among pixel information of the images captured by the plurality of cameras, and generating a virtual viewpoint image according to a position and an orientation of the virtual viewpoint, by using the texture of the second three-dimensional model to which the pixel information is applied according to the determining.

12. A non-transitory computer readable storage medium storing a program for causing a computer to execute a generation method, the generation method comprising:

acquiring, based on a first three-dimensional model of an object captured by a plurality of cameras from a plurality of different directions, correspondence information indicating correspondence between a point of an image captured by at least one of the plurality of cameras and a point related to a second three-dimensional model of the object less accurate than the first three-dimensional model, wherein the correspondence information is acquired based on first correspondence relationship information and second correspondence relationship information, the first correspondence relationship information representing a correspondence relationship between a point of the image captured by at least one of the plurality of cameras and a point of the first three-dimensional model, and the second correspondence relationship information representing a correspondence relationship between a point of the first three-dimensional model and a point related to the second three-dimensional model; and generating a virtual viewpoint image according to a position and an orientation of a virtual viewpoint, by using an image captured by one or more of the plurality of cameras and the acquired correspondence information.

* * * * *